United States Patent [19]
Thorner et al.

[11] Patent Number: 5,565,840
[45] Date of Patent: Oct. 15, 1996

[54] TACTILE SENSATION GENERATOR

[76] Inventors: Craig Thorner, 16 Nantucket Ct., Howell, N.J. 07731; Thomas K. Glass, 277 Frank Applegate Rd., Jackson, N.J. 08527

[21] Appl. No.: 309,764

[22] Filed: Sep. 21, 1994

[51] Int. Cl.$^6$ ...................................................... H04B 3/36
[52] U.S. Cl. .................... 340/407.1; 340/323 R; 348/157; 434/114
[58] Field of Search .................... 434/113, 114, 434/118, 45; 340/407.1, 323 R; 472/69, 70; 364/410; 273/86 D, 85 G, 148 B, 460; 348/13, 157

[56] References Cited

U.S. PATENT DOCUMENTS

| | | | |
|---|---|---|---|
| 3,736,551 | 5/1973 | Hirsch | 340/407.1 |
| 4,244,120 | 1/1981 | Harris | 340/407.1 |
| 4,553,748 | 11/1985 | Allen et al. | 273/85 G |
| 4,713,651 | 12/1987 | Morag | 340/407.1 |
| 4,771,344 | 9/1988 | Fallacaro et al. | 273/460 |
| 5,165,897 | 11/1992 | Johnson | 434/112 |
| 5,185,561 | 2/1993 | Good et al. | 345/156 |
| 5,327,120 | 7/1994 | McKee et al. | 340/407.1 |
| 5,389,865 | 2/1995 | Jacobus et al. | 395/95 |
| 5,405,152 | 4/1995 | Katanics et al. | 273/438 |

*Primary Examiner*—Brent A. Swarthout
*Attorney, Agent, or Firm*—Thomason & Moser

[57] ABSTRACT

A tactile sensation generator capable of producing tactile sensations to a video game player corresponding to activity portrayed in a video game. Specifically, an interface circuit is responsive to control commands generated by a computer executing the video game program. The interface circuit interprets the control commands and activates the tactile sensation generator. The tactile sensation generator contains a vest or harness for maintaining a flexible pad proximate a player's body. The pad contains one or more actuators, e.g., a solenoid or vibratory motor embedded in the pad. Each actuator interacts with the wearer and is individually activated to produce a localized tactile sensation, e.g., an impact or vibration, corresponding to the action simultaneously portrayed by the video game on a computer screen or television.

20 Claims, 2 Drawing Sheets

TACTILE SENSATION GENERATOR

BACKGROUND OF THE DISCLOSURE

1. Field of the Invention

The invention relates to virtual reality computer systems and, more particularly, to a tactile sensation generator within a virtual reality computer system.

2. Description of the Prior Art

Video games are typically executed by microprocessors within dedicated game consoles or computers such that a player interactively manipulates a video game scene as displayed on a video monitor or television using a keyboard, mouse, joystick, or some other command input device. In addition to the video output, most game apparatus also produces an audio output that corresponds to the scene presently displayed on the monitor. In this manner, a player is exposed to both auditory and visual sensation from the game apparatus.

Although today's audio-visual game experience is exciting, the excitement is limited by the game's inability to produce any form of tactile sensation corresponding to the scene being displayed. Generally, tactile sensation, such as vibration, fist and bullet strikes and the like, have not been simulated with any great success. In one available tactile sensation generator, a modified speaker is positioned below a player's seat such that low frequencies in the sound applied to the modified speaker vibrates the seat. In such a system, the sound volume must be very loud to achieve the sensation of vibration.

Therefore, a need exists in the art for a tactile sensation generator capable of interpreting control signals supplied by a video game such that the tactile sensation generator produces tactile sensation corresponding to the activity portrayed on a computer monitor by the game apparatus.

SUMMARY OF THE INVENTION

The present invention overcomes the disadvantages of the prior art by providing a tactile sensation generator capable of producing tactile sensations for a video game player corresponding to the activity portrayed by the game apparatus. Specifically, the invention contains an interface circuit that is responsive to control commands generated by a computer or video game console executing the video game program. The interface circuit interprets the control commands and activates the tactile sensation generator. The tactile sensation generator contains a vest or harness for maintaining a flexible pad proximate a player's body. The pad contains one or more actuators, e.g., a solenoid or vibratory actuators embedded in the pad. Each actuator is individually activated to produce a localized tactile sensation, e.g., an impact or vibration, against the body of a video game player. The sensation occurs simultaneously with impacts to the player's video game character portrayed by the computer system.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
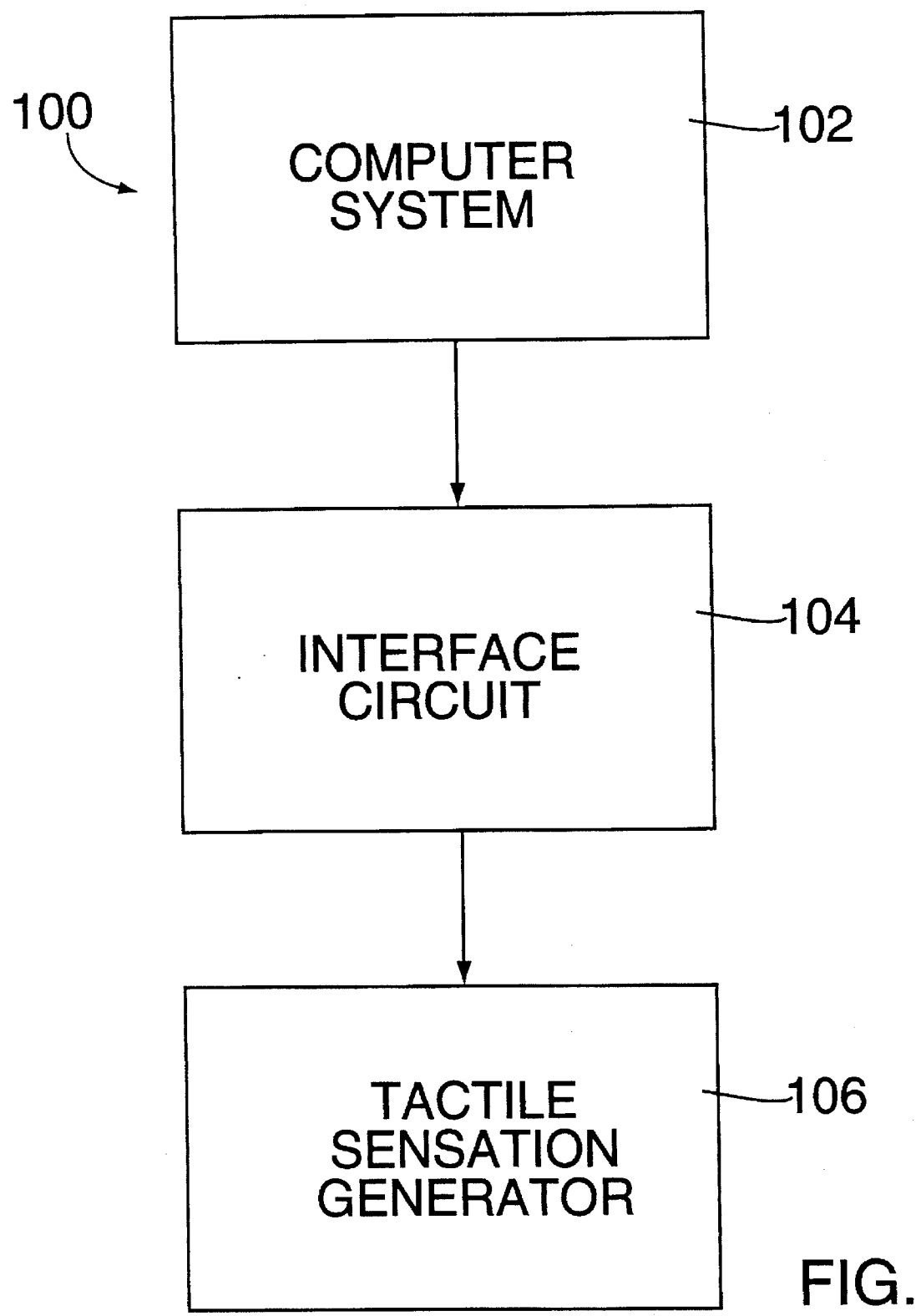
FIG. 1 depicts a high level block of a virtual reality computer system.

FIG. 1 depicts a high level block diagram of a virtual reality computer system 100 containing a computer system 102, an interface circuit 104, and a tactile sensation generator 106. The computer system 102 is a conventional home computer capable of executing various computer game programs. Alternatively, a dedicated video game console can be substituted for the computer system. In any event, the game programs generate control commands for the tactile sensation generator 106 to implement as tactile sensations corresponding to the present scene portrayed on a conventional computer monitor or television (not specifically shown, but a well known component of a computer system). Typically, these sensations simulate bullet strikes, punches to the body, knife slashes and the like. To implement the control commands, the interface circuit 104 is connected to an output signal port on the computer system 102, e.g., a parallel port. The interface circuit 104 interprets the commands and sends appropriate drive signals to actuators within the tactile sensation generator 106 such that an appropriate tactile sensation is generated corresponding to the presently portrayed activity on the computer monitor.

Figure 3:
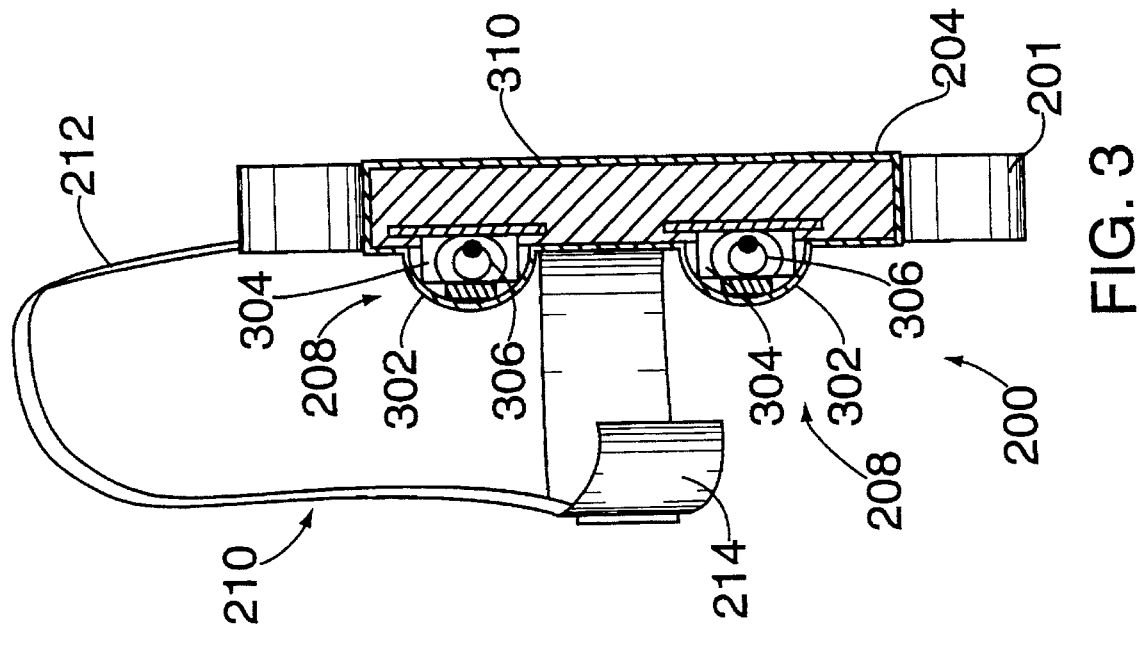
FIG. 3 depicts a cross sectional view of the tactile sensation generator along line 3—3 of FIG. 2.
Figure 2:
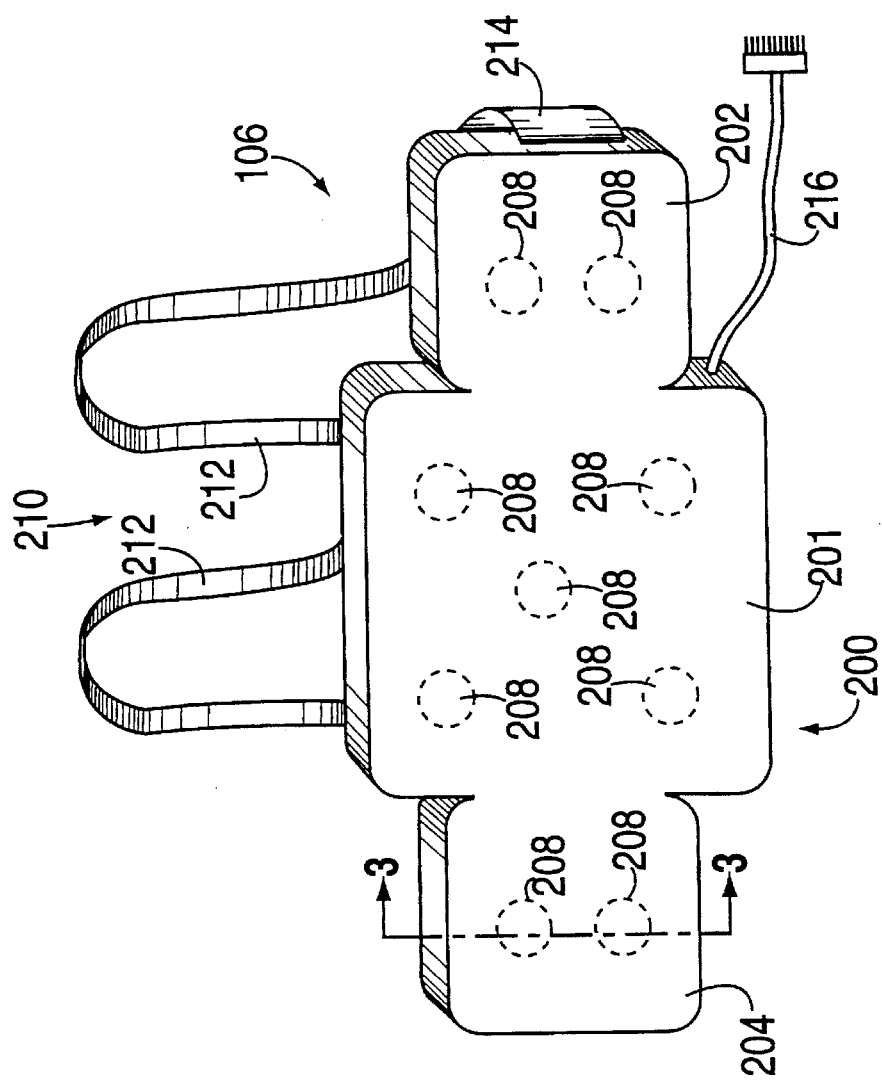
FIG. 2 depicts a front perspective view of a tactile sensation generator.

FIG. 2 depicts a front perspective view of a tactile sensation generator 106. FIG. 3 depicts a cross sectional view of the tactile sensation generator along line 3—3 in FIG. 2. To best understand the invention, the reader should simultaneously consult both FIGS. 2 and 3. In general, in response to computer generated commands, the tactile sensation generator 106 induces tactile sensation into a person wearing the generator.

Specifically, the generator 106 contains a substantially unitary flexible pad 200 having a right ear 202 and a left ear 204 protruding from the right and left sides of a rectangular portion 201. The flexible pad is typically fabricated from a foam sheet having a thickness of approximately three-quarters of an inch. The flexible pad 200 has a plurality of actuators 208 imbedded or attached thereto. To ensure that the tactile sensation that each actuator generates couples to the body, a harness or vest 210 attaches the pad 200 to the wearer. The harness 210 contains two shoulder straps 212 and a belt 214 that extends around the back of the wearer. By properly adjusting the straps and the belt, the rectangular portion 200 snugly fits to the chest of the wearer and the ears 202 and 204 conform to the wearer's sides. Alternatively, a vest would be fabricated of cloth or some other flexible material and would have the pad attached thereto by stitching or an adhesive.

At various positions on the pad, the generator 106 contains an actuator 208, attached to or embedded within an inner surface of the pad, for generating a localized tactile sensation. These actuators can be solenoids, piezo-electric actuators, electro-mechanical buzzers, vibrating motors, and the like. When using solenoids, an aperture is provided through the pad such that the moveable portion of the solenoid can impact the wearer and the solenoid can be mounted to the outer surface of the pad. For illustrative purposes, the remainder of this disclosure describes the use of one or more electric motors as actuators. Those skilled in the art will realize from this disclosure that any other form of actuator is contemplated for use as a component of the tactile sensation generator. The control signals for the actuators are transmitted to the generator via cable 216.

Each actuator 208 is encased in a housing 304, typically fabricated of aluminum or hard plastic. A vibration transmission block 302, generally formed of hard plastic or wood, protrudes from the housing 304 such that its distal end impacts the body of the wearer. The block 302 is attached to the housing by an adhesive such as epoxy. One example of such an actuator is an electric motor 306 having an offset weight attached to its shaft. When energized, an electric motor 306 with an offset shaft weight vibrates, thus, providing a tactile sensation.

A cloth, vinyl, or other covering material 310 is attached, by an adhesive, to the surface of the pad. The covering material 310 retains the actuator 306 in place on pad 200. Each of the plurality of actuators 208, e.g., nine, is installed into the pad in this manner. The nine actuators form an array of actuators wherein five actuators are located in the rectangular portion 201 and two actuators are located in each ear 202 and 204.

In operation, when each vibratory actuator 306 is energized, it vibrates. The vibration is transmitted through the transmission block 302 to the body of the wearer. The various commands from the computer specify which of the actuators shall be energized to simulate the game activity portrayed upon the computer monitor. As such, the wearer experiences tactile sensations that simulate the various body strikes that are portrayed in the video game.

The control commands from the computer are interpreted by the interface circuit 104 and are converted into an electric current for activating a selected actuator. In one illustrative implementation of a command structure, the parallel port of the computer system is used as the source of commands. Alternatively, a serial port could be used or the interface circuit could be implemented on a circuit card for connection to the parallel bus within the computer system.

The game program, as it executes on the computer system, is assumed to generate the appropriate command at the appropriate time. In one illustrative implementation of the invention, the tactile sensation generator 106 is divided into four zones. Specifically, the zones are front, right, left, and back. The front zone contains the five actuators in the rectangular portion 201. The right zone contains the two right most actuators in the rectangular portion 201 and the two actuators within the right ear 202. The left zone contains the two left most actuators in the rectangular portion 201 and the two actuators within the left ear 204. Lastly, the back zone contains the actuators located ill the left and right ears 202 and 204 of the pad.

A parallel port is capable of simultaneously transmitting 8 bits (bits 0 through 7) that indicate the actuators to activate within each zone. In the illustrative implementation, bits 0 and 1 are used to define a zone to activate, e.g., back, front, right or left. Furthermore, bits 2, 3, and 4 are used to define the number of actuators in the selected zone that are to be simultaneously activated, e.g., 1 through 5 or all nine actuators. If bits 2, 3, and 4 are all ones, this indicates a special weapon is being portrayed by the video game. A special weapon, such as a sword, generally requires a number of actuators to be sequentially activated. Bits 5, 6, and 7 are used to define the characteristics of the special weapon, e.g., a strike direction such as horizontal, diagonal and the like. As such, a weapon strike such as a sword slash along a diagonal trajectory activates three selected front zone actuators in sequential order.

In operation, for each blow or contact made to a player's character in a video game, the computer system generates an eight bit word as defined above. The word is sent to the parallel port or parallel bus and the interface circuit reads the word. The interface circuit interprets the word and activates the appropriate actuators within the tactile sensation generator to simulate the contact made to the player's on-screen character. Consequently, the player experiences a virtual reality attack while executing the computer game.

Although various embodiments which incorporate the teachings of the present invention have been shown and described in detail herein, those skilled in the art can readily devise many other varied embodiments that still incorporate these teachings.

What is claimed is:

1. Apparatus, worn by a person while interacting with a video game, for generating a tactile sensation to the person that corresponds to a location on a character in said video game that an event takes place, said apparatus comprising:

a flexible pad;

an actuator positioned upon said pad and having a moveable portion extending from said pad, where said moveable portion comprises an offset weight attached to a shaft; and a harness, attached to said flexible pad, for attaching said flexible pad to said person such that the moveable portion is positioned proximate the person, whereby activation of said actuator provides said person with a tactile sensation at a proximate corresponding location of the person corresponding to a location on a character in said video game that an event takes place.

2. The apparatus of claim 1 further comprising an interface circuit for interpreting commands from a computer that controls activation of said actuator.

3. The apparatus of claim 1 wherein said flexible pad contains a plurality of apertures, each having a corresponding actuator positioned therein and having a moveable portion extending from the aperture.

4. The apparatus of claim 1 wherein said actuator further comprises:

a transmission block extending a surface of a housing enclosing said actuator; and an actuator motor, abutting said transmission block, for producing vibration that is carried by said transmission block.

5. The apparatus of claim 1 wherein said actuator is a solenoid.

6. The apparatus of claim 3 wherein each of said actuators further comprises:

a transmission block extending a surface of a housing enclosing said actuator; and an actuator motor, abutting said transmission block, for producing vibration that is carried by said transmission block.

7. The apparatus of claim 3 wherein each of said actuators is a solenoid.

8. The apparatus of claim 2 wherein said commands are provided to said interface circuit on a parallel port of said computer.

9. The apparatus of claim 1 wherein said flexible pad further comprises a central rectangular portion having a left ear extending from the left side of said rectangular portion and a right ear extending from the right side of said rectangular portion.

10. The apparatus of claim 9 wherein said flexible pad further comprises a plurality of apertures in said rectangular portion, each aperture having an actuator therein and two apertures in each ear, each aperture having an actuator therein.

11. The apparatus of claim 1 wherein said actuator is an electric motor and said shaft is a part of said electric motor.

12. The apparatus of claim i wherein said flexible pad is a flexible chest pad.

13. Apparatus, worn by a person while interacting with a video game being executed on a video game system, for generating a tactile sensation to the person that corresponds to the location on a character in said video game that an event takes place, said apparatus comprising:

a flexible chest pad;

a plurality of actuators positioned upon said flexible chest pad and each actuator having a moveable portion for transmitting actuator motion to the person;

a harness, attached to said flexible chest pad, for attaching said flexible chest pad to the person such that each said moveable portion is positioned proximate to the chest of the person, whereby activation of said actuators provide the person with a tactile sensation corresponding to the action portrayed on the video game system; and an interface circuit for interpreting commands from the video game system to output signals to selectively drive said actuators.

14. The apparatus of claim 13 wherein said flexible chest pad contains a plurality of apertures, each having a corresponding actuator positioned therein.

15. The apparatus of claim 13 wherein each of said actuators further comprises:

a transmission block extending a surface of a housing enclosing said actuator; and an actuator motor, abutting said transmission block, for producing vibration that is carried by said transmission block.

16. The apparatus of claim 13 wherein said actuator is a solenoid.

17. The apparatus of claim 13 wherein said actuator is an electric molar having a shaft with an offset weight.

18. The apparatus of claim 13 wherein said commands are provided to said interface circuit on a parallel port of the video game system.

19. The apparatus of claim 13 wherein said flexible chest pad further comprises a central rectangular portion having a left ear extending from a left side of said rectangular portion and a right ear extending from a right side of said rectangular portion.

20. The apparatus of claim 19 wherein said flexible chest pad further comprises a plurality of apertures in said rectangular portion, each aperture having an actuator therein and two apertures in each ear, each aperture having an actuator therein.

* * * * *